United States Patent [19]

Tsumoto et al.

[11] Patent Number: 4,508,382
[45] Date of Patent: Apr. 2, 1985

[54] GUTTER STRUCTURE FOR A VEHICLE BODY

[75] Inventors: Akio Tsumoto, Tokyo; Hisae Kano, Tokorozawa, both of Japan

[73] Assignee: Nissan Motor Company, Limited, Yokohama, Japan

[21] Appl. No.: 559,442

[22] Filed: Dec. 8, 1983

Related U.S. Application Data

[63] Continuation of Ser. No. 327,969, Dec. 7, 1981, abandoned.

[30] Foreign Application Priority Data

Dec. 12, 1980 [JP] Japan .................... 55-174687

[51] Int. Cl.³ ............................... B62D 25/06
[52] U.S. Cl. .......................... 296/213; 296/154
[58] Field of Search ............. 296/213, 154; 293/128

[56] References Cited

U.S. PATENT DOCUMENTS

| | | | |
|---|---|---|---|
| 3,550,950 | 12/1970 | Pollock | 296/213 |
| 3,596,980 | 8/1971 | Cadiou | 296/154 |
| 3,606,433 | 9/1971 | Kunevicius | 293/128 |
| 4,036,522 | 7/1977 | De Rees et al. | 296/154 |
| 4,304,435 | 12/1981 | Everts et al. | 296/213 |

FOREIGN PATENT DOCUMENTS

| | | | |
|---|---|---|---|
| 119522 | 9/1980 | Japan | 296/213 |
| 2078635 | 1/1982 | United Kingdom | 296/213 |

*Primary Examiner*—Joseph F. Peters, Jr.
*Assistant Examiner*—Ross Weaver
*Attorney, Agent, or Firm*—Schwartz, Jeffery, Schwaab, Mack, Blumenthal & Koch

[57] ABSTRACT

A gutter structure for a vehicle body furnished with a roof panel, a roof edge rail, and a door sash, includes a gutter channel, a molding, and a clip. The channel extends along the edge of the roof panel and is constructed integrally with the roof panel. The channel consists of a bottom wall, inner and outer side walls extending from the opposite sides of the bottom wall. The inner side wall is connected at its upper end to the edge of the roof panel. The channel is fixed to the roof edge rail at its bottom wall. The molding extends along the channel in order to cover the channel in such a manner as to permit water on the roof panel to enter the channel. The molding has an outer surface which forms a smooth convex contour in conjunction with outer surfaces of the roof panel and the door sash when the vehicle door is closed. The molding is mounted on the clip, which is attached to the channel to secure the molding in place.

3 Claims, 5 Drawing Figures

GUTTER STRUCTURE FOR A VEHICLE BODY

This is a continuation of application Ser. No. 327,969, filed Dec. 7, 1981 now abandoned.

BACKGROUND OF THE INVENTION

1. Field of the Invention

This invention relates to a gutter structure for a vehicle body, and more particularly to a gutter structure which produces improved structural strength, sealing, and air resistance properties.

2. Description of the Prior Art

Automotive vehicle bodies are conventionally provided with gutters which usually extend along roof edges and windshield edges, that is, front pillars, to drain water from the roof. Various type gutters have been developed for automotive vehicles; no gutter design has been completely satisfactory from the standpoint of air resistance, structural strength, or sealing property, however.

SUMMARY OF THE INVENTION

Accordingly, it is an object of the present invention to provide a gutter structure for a vehicle body which produces improved structural strength, sealing, air resistance, and attachment alignment accuracy.

According to the present invention, a gutter structure for a vehicle body furnished with a roof panel, a roof edge rail, and a door sash, includes a gutter channel, a molding, and a clip. The channel extends along the edge of the roof panel and is constructed integrally with the roof panel. The channel consists of a bottom wall, and inner and outer side walls extending from the opposite sides of the bottom wall respectively. The inner side wall is connected at its upper end to the edge of the roof panel. The bottom wall of the channel is fixed to the roof edge rail. The molding extends along the channel in order to cover the channel in such a manner as to permit water on the roof panel to enter the channel. The molding has an outer surface which forms a smooth convex contour in conjunction with outer surfaces of the roof panel and the door sash when the door sash is in a closed position. The clip carries firmly the molding and is engaged to the channel to secure the molding in place.

The above and other objects, features and advantages of the present invention will be apparent from the following description of preferred embodiments thereof, taken in conjunction with the drawings.

DESCRIPTION OF THE PREFERRED EMBODIMENTS

Figure 1:
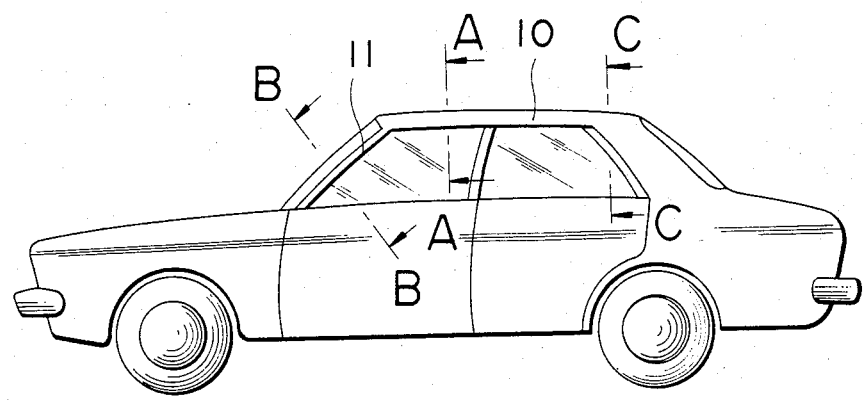
FIG. 1 is a side view of an automotive vehicle, the body of which is furnished with a gutter structure of a first embodiment of the present invention.
Figure 2:
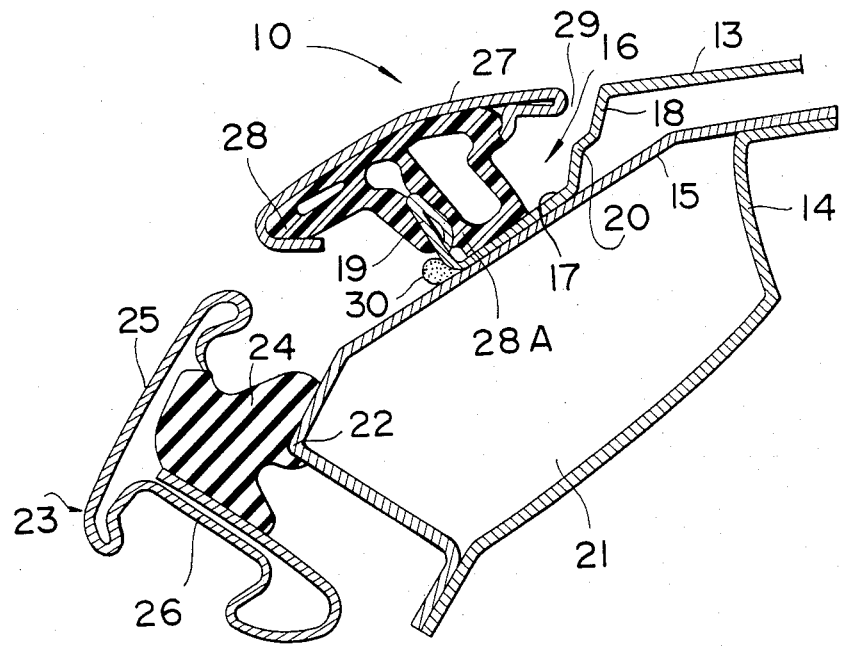
FIG. 2 is a cross-section view of the side of the vehicle body taken on line A—A of FIG. 1.
Figure 3:
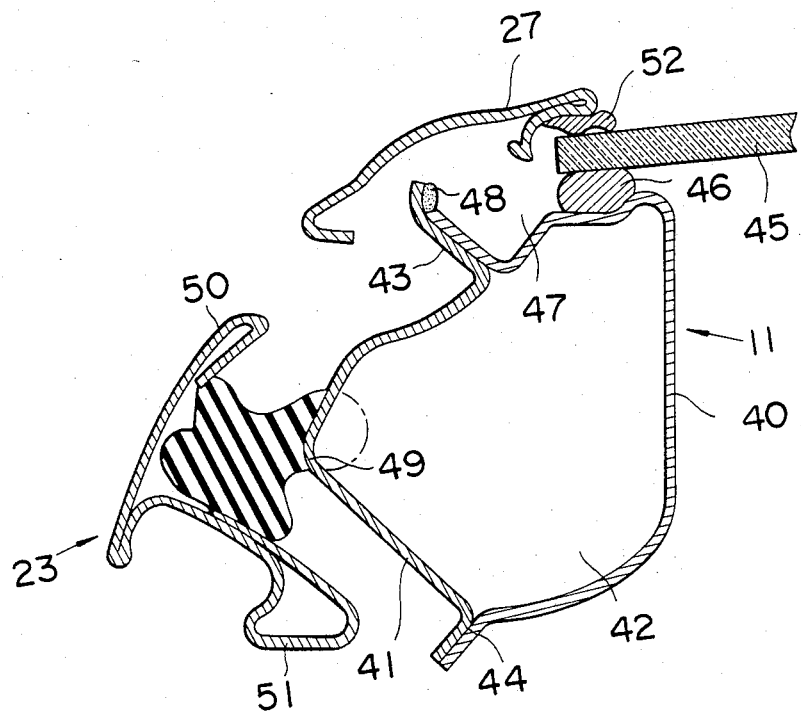
FIG. 3 is a cross-section view of the side of the vehicle body taken on line B—B of FIG. 1.
Figure 4:
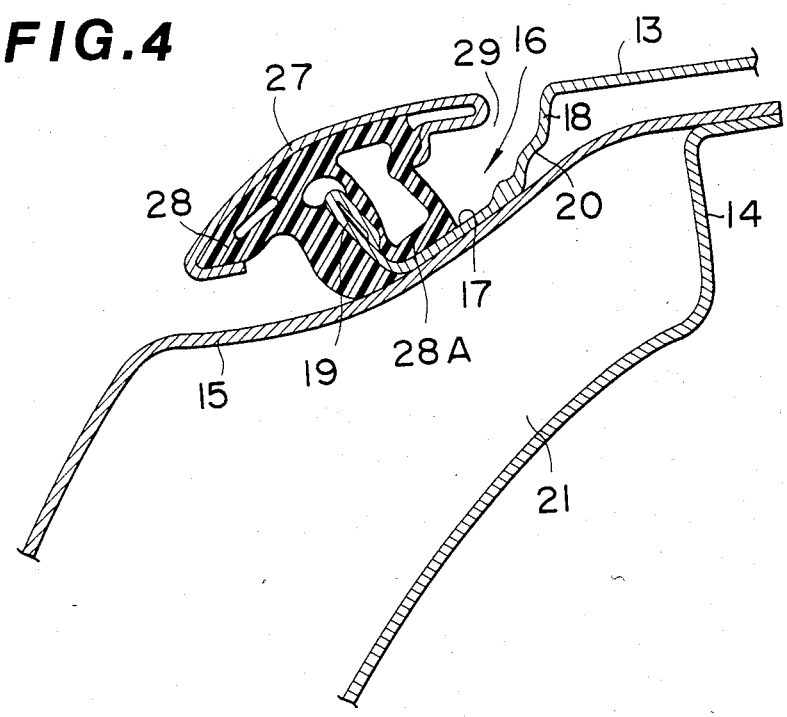
FIG. 4 is a cross-section view of the side of the vehicle body taken on line C—C of FIG. 1.

With reference to FIG. 1, there is shown an automotive vehicle, the body of which is furnished with a gutter structure of a first embodiment of the present invention. The gutter extends along roof edges 10 and windshield edges, that is, front pillars 11 to conduct water from the roof to the lower ends of the pillars 11. The gutter along one side of the vehicle body is shown in FIGS. 2 to 4. The gutter along the other side of the vehicle body is designed similarly and symmetrically with respect to that shown in FIGS. 2 to 4, so that description thereof will be omitted.

As shown in FIGS. 2 and 4, the edge of the roof 10 includes a roof panel 13, inner and outer rail panels 14 and 15. The roof panel 13 integrally includes a longitudinally extending U-shaped gutter channel 16 on either side of the vehicle body. The channel 16 consists of a bottom wall 17, inner and outer side walls 18 and 19 extending upwards from the opposite sides of the bottom wall 17 respectively. The side walls 18 and 19 are constructed integrally with the bottom wall 17. The inner side wall 18 extends downwards from the edge of the roof panel 13. The profile of the inner wall 18 includes a lateral step 20 which extends longitudinally with respect to the vehicle body. The outer wall 19 is of a partially double wall structure, which is formed by a hairpin fold at the upper edge of the outer wall 19.

The inner and outer rail panels 14 and 15 are fixed to each other along their opposite edges in such a manner that a longitudinally extending spacing 21 is provided therebetween. The outer rail panel 15 is located above the inner rail panel 14. The roof panel 13 and the channel 16 are located above the outer rail panel 15. The channel 16 is spot-welded onto the outer rail panel 15 at its bottom wall 17. The channel 16 constitutes a gutter for draining water from the roof panel 13.

The outer rail panel 15 has a corner 22 along its outermost edge, which projects further outward than the channel 16 with respect to the vehicle body. When a passenger door is closed, the corresponding door sash 23 is positioned near outside of the corner 22 on the outer rail panel 15 and a length of weatherstrip 24 attached to the door sash 23 is abutted against the panel 15 at its corner 22 so as to cover the corner 22 and effect a seal between the door sash 23 and the panel 15. The door sash 23 includes integrally formed, longitudinally-extending upper and lower members 25 and 26. When the door is closed, the upper member 25 extends in cross-section from the outer end of the lower member 26 in a direction intermediate between the upward direction and inwardly lateral direction with respect to the vehicle body. When the door is closed, the lower member 26 extends in cross-section in a direction intermediate between the downward direction and inwardly lateral direction with respect to the vehicle body. The weatherstrip 24 is attached to both the upper and lower members 25 and 26 along the longitudinally extending corner formed by them and facing the corner 22 of the outer rail panel 15.

A channel molding 27 formed by roll-forming a metal or resin is provided for covering the channel 16 and for that purpose extends along the channel 16. The molding 27 extends in cross-section in a direction intermediate between the upward direction and the laterally inward direction with respect to the vehicle body. The molding 27 is attached to the outer wall 19 of the channel 16 by means of a longitudinally-extending clip 28 made of a resin or rubber. The clip 28 is clamped along its opposite sides by the opposing sides of the molding 27 which are bent around to hold the clip 28 firmly on the lower surface of the molding 27. In this way, the molding 27 completely covers the top surface of the clip 28 while the clip 28 carries firmly the molding 27 thereon. The clip 28 has therein a longitudinally-extending slit which is open to the surface opposite to the molding 27 for accommodating the outer wall 19 of the channel 16. The outer wall 19 fits snugly into the slit in the clip 28 to mount the molding 27 on the outer wall 19. The slit in the clip 28 is narrow and the material of the clip 28 has an elasticity sufficient to hold the outer wall 19 firmly when the outer wall 19 is inserted into the slit in the clip 28. The slit in the clip 28 is deep enough to accommodate the outer wall 19. The double wall structure of the outer wall 19 offers sufficient frictional force against the clip 28 in the fitted position of the outer wall 19 to provide a sure attachment of the clip 28 to the outer wall 19. The clip 28 has a longitudinally-extending projection 28A, which is of a shape corresponding to that of the inside corner formed by the outer wall 19 and the bottom wall 17 of the channel 16. The projection 28A is pressed against the corner of the channel 16 by the elasticity of the clip 28 in the inserted position of the outer wall 19, so that the clip 28 accurately aligns the molding 27 in place. In this way, the clip 28 is engaged to the gutter channel 16 to secure the molding 27 in place. The clip 28 may be divided into a series of aligned segments.

The molding 27 is located between the upper member 25 of the door sash 23 and the roof panel 13 in such a manner that a gap 29 is provided between the molding 27 and the roof panel 13 to admit water from the panel 13 into the channel 16. The upper member 25, the molding 27, and the roof panel 13 are so arranged that their outer surfaces constitute a smooth convex contour which is continuous with the contour of the vehicle body. Thus, the channel 16 is positioned inside the smooth contour of the vehicle body, so that this gutter structure produces an improved air resistance property as compared to a conventional gutter structure which has a channel protruding from the smooth contour of a vehicle body.

In assembly, one welding electrode is inserted into the spacing 21 through a hole (not shown) in the inner rail panel 14 and contacted to the lower surface of the outer rail panel 15 beneath the bottom wall 17 of the channel 16, the other welding electrode being contacted from above the corresponding upper surface of the bottom wall 17. Then spot-welding is performed to fix the channel 16 to the outer rail panel 15. After the spot-weld, sealing material 30 is applied from outside to the outer wall 19 of the channel 16 and the outer rail panel 15 at the longitudinally-extending base corner outside the channel 16, in order to water-proof the joint between the bottom wall 17 of the channel 16 and the outer rail panel 15. Then, the molding 27 is attached to the outer wall 19 of the channel 16 by means of the clip 28. Since the channel 16 is constructed integrally with the roof panel 13, the roof panel 13 is directly fixed to the outer rail panel 15. This direct attachment of the roof panel 13 to the outer rail panel 15 ensures adequate structural strength of the gutter structure and the vehicle body. Since the application of the sealing material 30 is performed from outside, the efficiency of assembly is improved. Since the molding 27 is easily attached to the outer wall 19 of the channel 16 by means of the clip 28, the efficiency of assembly is further improved and the incidence of attachment error is reduced. Since the sealing material 30 is applied to the base corner, the sealing material 30 can contact the outer wall 19 and the outer rail panel 15 with large areas so that it produces an adequate seal between the outer wall 19 and the outer rail panel 15.

As shown in FIG. 3, the front pillar 11 includes inner and outer pillar panels 40 and 41, the edges of which are attached together in such a manner that a spacing 42 of roughly triangular cross-section is provided therebetween. The front pillar 11 and thus the panels 40 and 41 extend in a direction nearly intermediate between the frontward and downward directions with respect to the vehicle body. The attached edges of the panel 40 and 41 protrude so as to form first and second flanges 43 and 44 respectively. The side of a windshield 45 is attached by means of sealant 46 to the inner pillar panel 40 at a position inward of the first flange 43 with respect to the vehicle body. The first flange 43 extends in cross-section in a direction nearly intermediate between the frontward and the laterally outward directions with respect to the vehicle body. The edge of the outer pillar panel 41 extends slightly farther from that of the inner pillar panel 40 so as to form a step along the top end of the first flange 43 and is bent slightly inward. The first flange 43, the inner pillar panel 40, the sealant 46 provided between the panel 40 and the windshield 45, and the windshield 45 constitute a channel 47 which extends along the front pillar 11 and communicates with the channel 16 (see FIGS. 2 and 4) for draining water from the roof panel 13 (see FIGS. 2 and 4) to the lower end of the front pillar 11. The sealant 46 prevents water entering between the windshield 45 and the inner pillar panel 40. Sealing material 48 is applied to the inner and outer pillar panels 40 and 41 at the step along the top end of the first flange in order to prevent water entering between the inner and outer pillar panels 40 and 41.

The outer pillar panel 41 has an outer corner 49 outward and rearward of the channel 47 with respect to the vehicle body. When the door is closed, the door sash 23 is positioned near the corner 49 and the weatherstrip 24 attached to the door sash 23 abuts against the outer pillar panel 41 at the corner 49 so as to effect a seal between the door sash 23 and the outer pillar panel 41. The door sash 23 includes integrally formed first and second members 50 and 51. The first member 50 extends from the outer end of the second member 51 in cross-section in a direction slightly inclined from the frontward direction to the inwardly lateral direction with respect to the vehicle body. The second member 51 extends in cross-section approximately in the laterally inward direction with respect to the vehicle body. The first and second members 50 and 51 are connected to the upper and lower members 25 and 26 (see FIGS. 2 and 4) respectively. The weatherstrip 24 is attached to both the first and second members 50 and 51 in the corner formed by them and facing the corner 49 of the outer pillar panel 41.

The channel molding 27 is also intended to cover the channel 47 and therefore extends along the channel 47. The molding 27 extends in cross-section in a direction nearly intermediate between the frontward and the inwardly lateral directions with respect to the vehicle body, slightly over the edge of the windshield 45. The edge of the windshield 45 extends in cross-section in a direction slightly inclined from the lateral direction to the frontward direction with respect to the vehicle body. A sealant 52 is provided between the windshield 45 and the molding 27. The molding 27 is attached to the first flange 43 by means of a clip (not shown) in a way similar to that along the roof edge 10 (see FIGS. 2 and 4). This clip (not shown) is designed in a manner substantially similar to the clip 28 shown in FIGS. 2 and 4, and has a slit for receiving the first flange 43. The molding 27 is located roughly between the windshield 45 and the first member 50 of the door sash 23. The first member 50, the molding 27, and the windshield 45 are so arranged that their outer surfaces constitute a smooth convex contour which is continuous with the contour of the vehicle body. Thus, the channel 47 is positioned inside the smooth contour of the vehicle body, so that this gutter structure provides for reduced air resistance.

Figure 5:
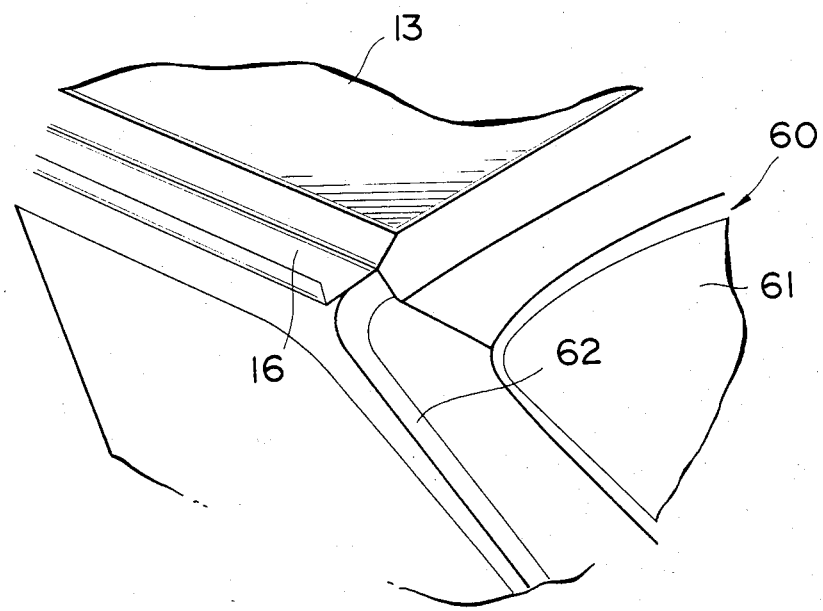
FIG. 5 is a perspective partial-view of a back-door-equipped automotive vehicle, the body of which is furnished with a gutter structure of a second embodiment of the present invention.

A second embodiment of the present invention is illustrated in FIG. 5, wherein corresponding and similar elements are designated by the same numerals as those of FIGS. 1 to 4. This embodiment is adapted for an automotive vehicle body having a back door 60 and is arranged in a manner similar to the previous first embodiment except for the following points.

The back door 60 includes a door window 61. A pair of drain channels 62 are provided along the opposite sides of the window 61 or the back door 60. Only one drain channel 62 is shown in FIG. 5. The rear end of the channel 16 extending along the side of the roof panel 13 is positioned immediately above the upper end of the drain channel 62 so that water can flow from the channel 16 immediately into the drain channel 62 even when the back door 60 is opened. The molding for the channel 16 is omitted in FIG. 5 for the purpose of easier understanding.

Since water in the channel 16 can flow to the drain channel 62 in addition to the channel along the front pillar (see FIG. 3), this gutter structure provides for improved drainage and prevents water from falling from the channel 62 onto rear fenders (not shown), and to the interior of the vehicle when the back door 60 is opened. Since this gutter structure covers the attachment portions of the roof panel 13 and the rear fenders, solder treatment for providing a good outward appearance of the attachment portions can be eliminated and therefore the cost of manufacturing the vehicle can be reduced.

It should be understood that further modifications and variations may be made in the present invention without departing from the spirit and scope of the present invention as set forth in the appended claims.

What is claimed is:

1. A vehicle body structure comprising:
   (a) a roof edge rail having an inclined outer panel with an outer edge, and a corner positioned at said outer edge;
   (b) a roof panel having a side bent downward, said side extending to the outer panel and then extending adjacent and parallel to the outer panel and finally being bent generally upward away from the outer panel, whereby the roof panel side forms a gutter channel, the parallel portions of the roof panel side and the outer panel being fixed to each other;
   (c) a door sash movable relative to the roof edge rail into and out of a closed position;
   (d) a weather strip attached to the door sash and engaging the corner of the roof edge rail when the door sash is in the closed position;
   (e) a molding, extending from a position near the downward bend of the roof panel to another position near an upper edge of the door sash in its closed position, for covering a recess between the downward portion of the roof panel side and the door sash in the closed position, the outer surfaces of the roof panel, the door sash, and the molding forming a smooth convex contour; and
   (f) a clip attaching the molding to the upward portion of the roof panel side.

2. A vehicle body structure as recited in claim 1 wherein the molding is made of metal.

3. A vehicle body structure as recited in claim 1 wherein the clip includes a series of aligned segments.

* * * * *